A. E. GARRISON.
DRUGGISTS' FILTER AND FUNNEL.
No. 170,167. Patented Nov. 23, 1875.
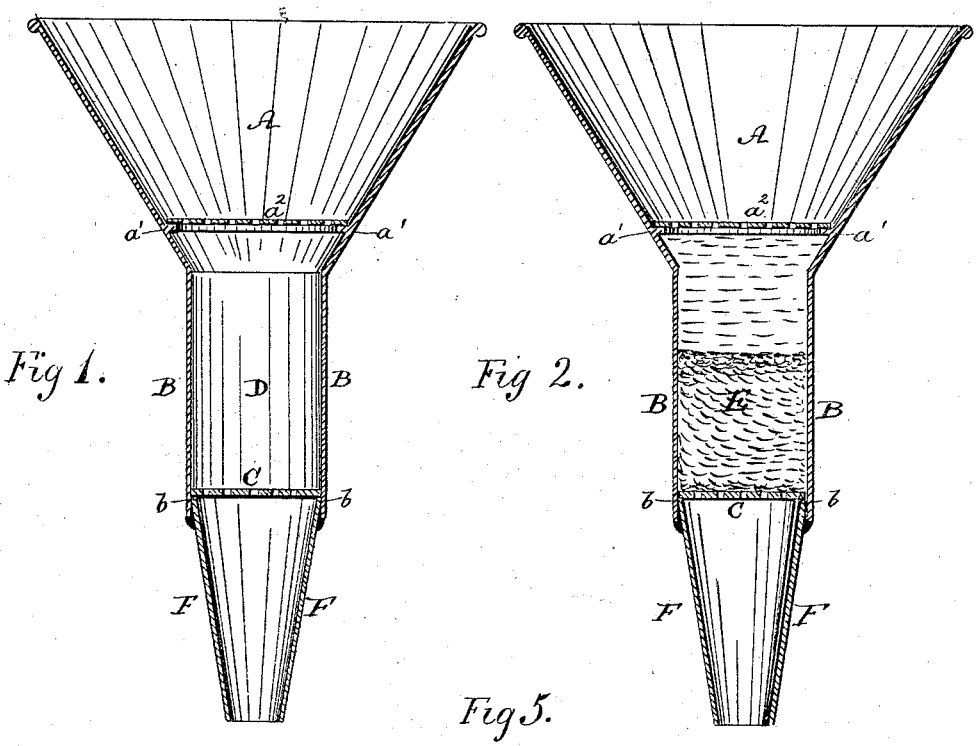
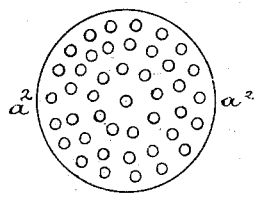
WITNESSES:
Colborne Brookes
J. B. Holderly
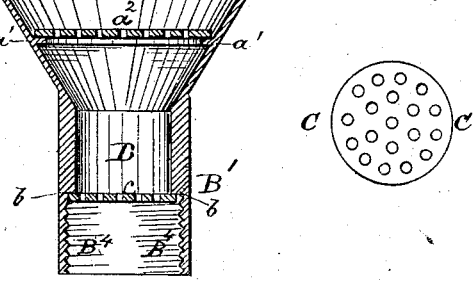
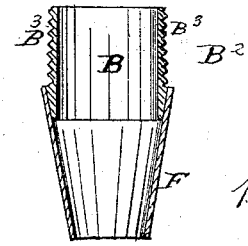
INVENTOR.
Abram E. Garrison
per Robt A. Lacey
ATTORNEYS.

UNITED STATES PATENT OFFICE.

ABRAM E. GARRISON, OF NEWTON, KANSAS.

IMPROVEMENT IN DRUGGISTS' FILTERS AND FUNNELS.

Specification forming part of Letters Patent No. 170,167, dated November 23, 1875; application filed September 16, 1875.

*To all whom it may concern:*

Be it known that I, ABRAM E. GARRISON, of Newton, in the county of Harvey and State of Kansas, have invented certain new and useful Improvements in Druggist Filters and Funnels; and I do hereby declare that the following is a full, clear, and exact description thereof, which will enable others skilled in the art to which it pertains to make and use the same, reference being had to the accompanying drawing, and to the letters of reference marked thereon, which form a part of this specification.

My invention relates to an improved combined druggist's filter and funnel, the nature of which will be fully explained by reference to the accompanying drawings, in which—

Figure 1 represents a vertical section of a combined funnel and filter constructed according to my invention. Fig. 2 shows a similar view, with filtering media applied between the strainers. Figs. 3 and 4 show plan views of the strainers separately. Fig. 5 is a vertical section of a slight modification of my invention.

In each of the views similar letters of reference are employed to indicate corresponding parts wherever they occur.

A represents a funnel, which, at $a^1$, is provided with a rim or ledge for the support of a removable perforated strainer, $a^2$. To the lower edge of the funnel A is connected a pipe or tube, B, which forms a continuation of the funnel A, and is provided with a rim or ledge, $b$, upon which rests the periphery of a removable perforated strainer, C, thereby forming a chamber, D, between the strainers $a^2$ and C for the reception of a sponge or other suitable filtering media, E, as shown by Fig. 2. To the lower end of the tube or pipe B is connected a funnel-shaped extension, F, capable of being received within the neck, mouth, or opening of a bottle or other receiver.

In Figs. 1 and 2 I have shown the pipe or tube B formed in one piece, and both of the strainers $a^2$ and C capable of removal from and replacement in their respective positions through the funnel A. The tube B may, however, be divided into two parts, $B^1$ $B^2$, as shown by Fig. 5, and the said parts connected together by means of a male screw-thread, $B^3$, on the part $B^2$ being received into a female thread, $B^4$, in the end of the part $B^1$. In this case the strainer C is inserted into the end of the part $B^1$, and held against the projecting rim $b$ by means of the end of the part $B^2$, when the said part $B^2$ is screwed up into position in the part $B^1$.

By thus constructing a combined funnel and filter for druggists' use I am enabled to produce an article which is simple in its construction and readily cleansed.

Having thus described my invention, what I claim, and desire to secure by Letters Patent, is—

1. A combined filter and funnel embodying in its construction upper and lower funnel-shaped portions A and F, connected together by a tube, B, having parallel sides, and forming, by means of the removable flat perforated strainers $a^2$ and C, a chamber, D, for the reception of filtering media E, the whole being constructed as and for the purpose described.

2. A combined filter and funnel embodying in its construction upper and lower funnel-shaped portions A and F, connected together by a divided tube, B, having parallel sides, the halves $B^1$ $B^2$ of said tube B being coupled together by screw-threads $B^3$ $B^4$, as shown, and holding the lower flat perforated strainer C between their ends, the upper strainer $a^2$ being supported on a rim, $a^1$, and forming a chamber, B, for the reception of filtering media E, the whole being constructed as and for the purpose shown and described.

In testimony that I claim the foregoing as my own I affix my signature in presence of two witnesses.

ABRAM E. GARRISON.

Witnesses:
HENRY C. SCHLEY,
B. E. HARDEMAN.